UNITED STATES PATENT OFFICE.

DAVID STRAUSS, OF BASEL, SWITZERLAND, ASSIGNOR TO SOCIETY OF CHEMICAL INDUSTRY IN BASLE, OF BASEL, SWITZERLAND.

PROCESS OF PRECIPITATING ALKALINE-EARTH OXALATES.

995,041.  Specification of Letters Patent.  Patented June 13, 1911.

No Drawing.  Application filed March 31, 1910. Serial No. 552,641.

*To all whom it may concern:*

Be it known that I, DAVID STRAUSS, chemist, a subject of the King of Prussia, and resident of Basel, Switzerland, have invented a new and useful Process of Precipitating Alkaline-Earth Oxalates, of which the following is a full, clear, and exact specification.

In the manufacture of oxalic acid it has been usual hitherto to precipitate calcium oxalate from the solution of alkali oxalate by adding milk of lime, whereby a caustic soda or caustic potash lye is obtained. In this process a portion of the oxalic acid is lost because the approximately quantitative precipitation of the oxalic acid as calcium oxalate occurs only in the presence of very dilute solutions of alkali oxalate and when a large excess of lime is used.

According to the present invention a sulfur compound of an alkali-earth metal, soluble in water, as for instance a mono- or a polysulfid of an alkali-earth metal or the sulfhydrate of a monosulfid of an alkali-earth metal, is substituted for lime as precipitant of the oxalic acid, with the result that the alkaline earth oxalate is precipitated even in very concentrated solutions. The precipitation occurs quantitatively even in solutions of the highest concentration, and an excess of the precipitant is not necessary. As a by-product a solution of alkali sulfid is obtained, which is useful as such or after evaporation.

The double decomposition is preferably effected at the ordinary temperature, but can also be effected at high temperature in an autoclave.

The following examples illustrate the invention, the parts being by weight.

Example 1: 134 parts of sodium oxalate are dissolved in 1300 parts of water and to the solution 166 parts of barium sulfid are added gradually, while stirring well. In addition to sodium sulfid, the insoluble barium oxalate is formed, which is filtered off, washed and worked up in a known manner. The reaction occurs in this example according to the following equation:

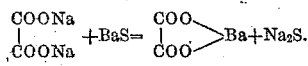

Example 2: 168 parts of calcium tetrasulfid are stirred into a solution of 134 parts of sodium oxalate in about 1200 parts of water. Calcium oxalate separates, while sodium tetrasulfid remains in solution. The reaction occurring in this example is expressed by the following equation:

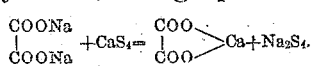

What I claim is:

1. The described process of precipitating oxalic acid in the form of an insoluble alkaline earth oxalate from solutions of alkali oxalates, which consists in adding to the oxalate solutions one of the herein described sulfur compounds of an alkali-earth metal, soluble in water, then filtering off the precipitated insoluble alkaline earth oxalate and finally washing it with water.

2. The described process of precipitating oxalic acid in the form of an insoluble alkaline earth oxalate from solutions of alkali oxalates, which consists in adding to the oxalate solutions a sulfid of an alkali earth metal, soluble in water, then filtering off the precipitated insoluble alkaline earth oxalate and finally washing it with water.

In witness whereof I have hereunto signed my name this 19th day of March, 1910, in the presence of two subscribing witnesses.

DAVID STRAUSS.

Witnesses:
GEO. GIFFORD,
AMAND RITTER.